United States Patent
Hasuike

(10) Patent No.: US 7,973,944 B2
(45) Date of Patent: Jul. 5, 2011

(54) IMAGE FORMING APPARATUS, IMAGE PROCESSING APPARATUS, PRINTING MEDIUM, IMAGE PROCESSING METHOD AND STORAGE MEDIUM READABLE BY COMPUTER

(75) Inventor: Kimitake Hasuike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1558 days.

(21) Appl. No.: 11/293,129

(22) Filed: Dec. 5, 2005

(65) Prior Publication Data

US 2007/0035758 A1 Feb. 15, 2007

(30) Foreign Application Priority Data

Aug. 12, 2005 (JP) .............................. P2005-234721

(51) Int. Cl.
G06F 3/12 (2006.01)
H04N 1/40 (2006.01)
G06K 15/02 (2006.01)
G06K 15/00 (2006.01)

(52) U.S. Cl. ......... 358/1.1; 358/3.28; 358/1.2; 358/1.18

(58) Field of Classification Search .................. 358/1.1, 358/1.2, 1.9, 1.16, 3.28, 1.18; 235/494; 178/19.01, 178/19.04, 20.01
See application file for complete search history.

(56) References Cited

U.S. PATENT DOCUMENTS

| 5,432,506 | A | 7/1995 | Chapman | 340/825.34 |
| 6,354,501 | B1* | 3/2002 | Outwater et al. | 235/462.01 |
| 6,651,894 | B2* | 11/2003 | Nimura et al. | 235/494 |
| 2002/0070281 | A1 | 6/2002 | Nimura et al. | |
| 2005/0052706 | A1* | 3/2005 | Nelson | 358/3.28 |

FOREIGN PATENT DOCUMENTS

| JP | 2002-240387 | 8/2002 |
| JP | 2003-528388 | 9/2003 |
| JP | 2004-096325 | 3/2004 |

\* cited by examiner

Primary Examiner — Thomas J Lett
(74) Attorney, Agent, or Firm — Morgan, Lewis & Bockius LLP

(57) ABSTRACT

An image forming apparatus includes: a document image generating portion that generates a document image which is instructed to be printed; a code image generating portion that generates a code image indicating a position on a medium; an accepting portion that accepts information indicating at least one of a first mode and a second mode, wherein a print image including the document image and the code image being printed in the first mode and a print image including the code image but not including the document image being printed in the second mode, and a printing portion that prints the print image on the medium in the mode pointed by information that the accepting portion accepts.

6 Claims, 13 Drawing Sheets

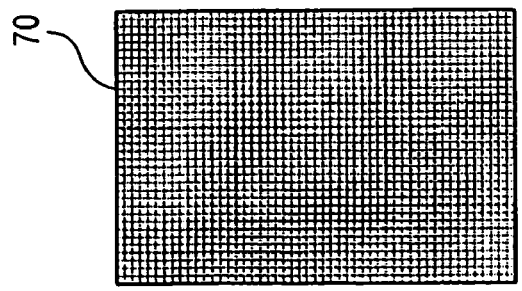
FIG. 2A
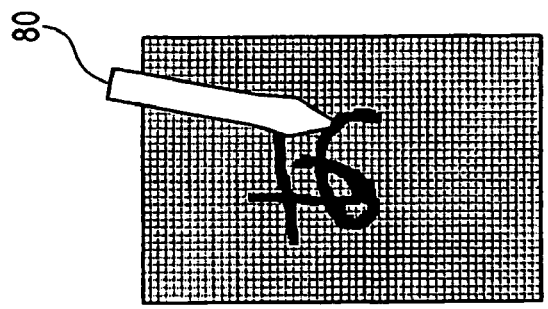
FIG. 2B
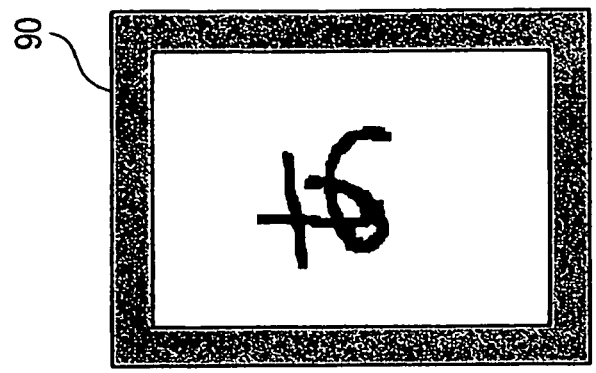
FIG. 2C

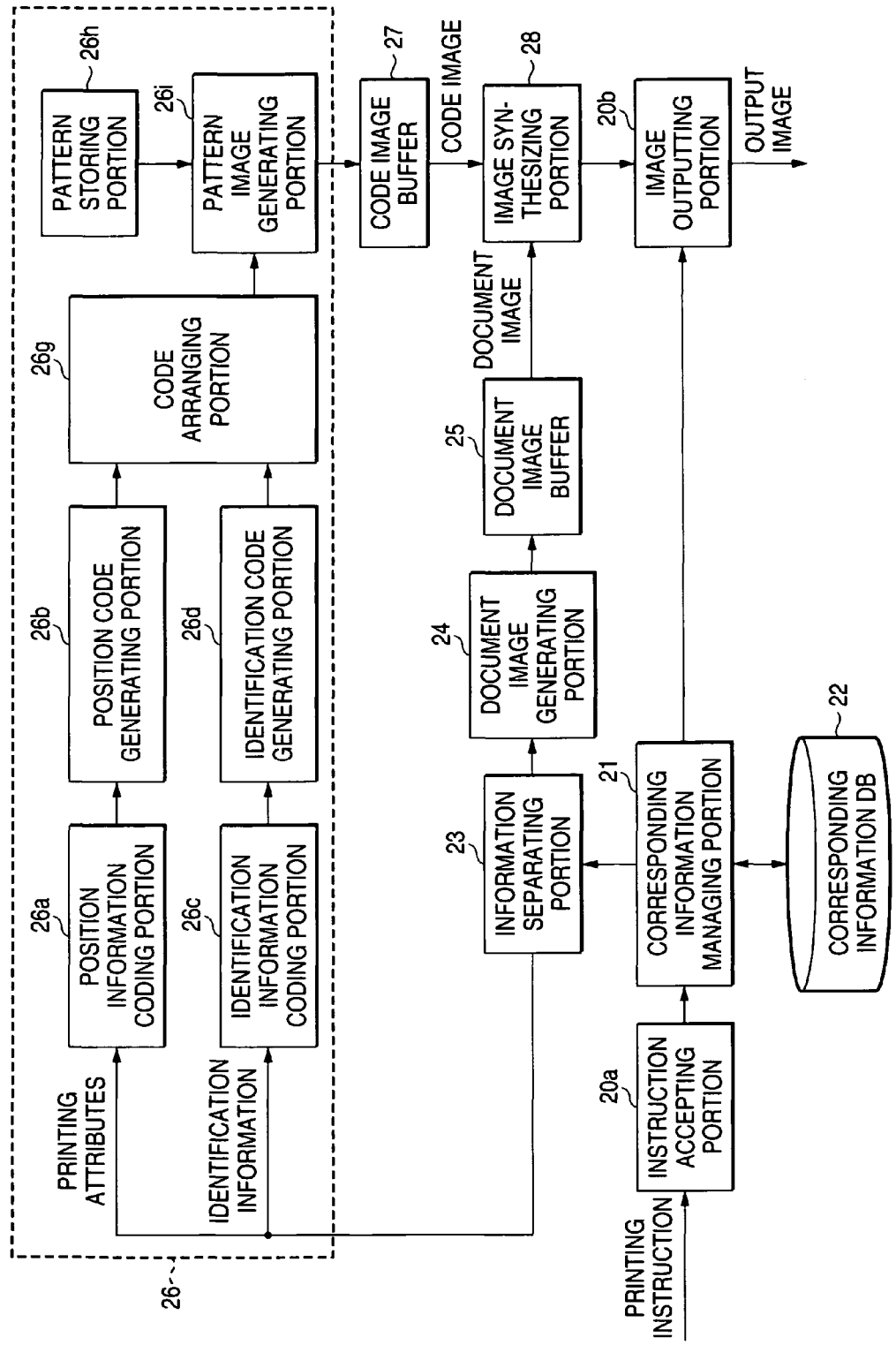

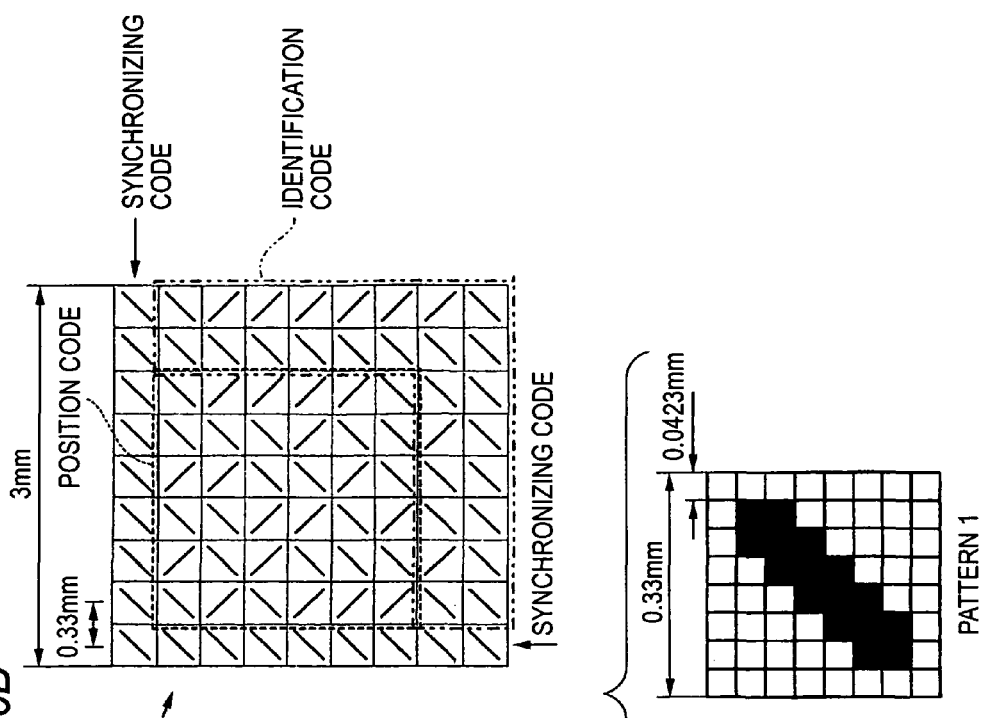
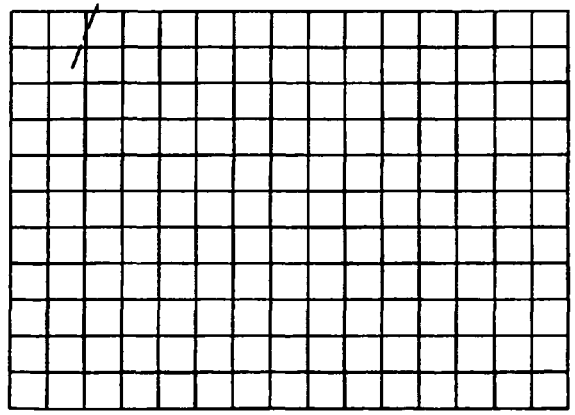
FIG. 6A
FIG. 6B
FIG. 6C

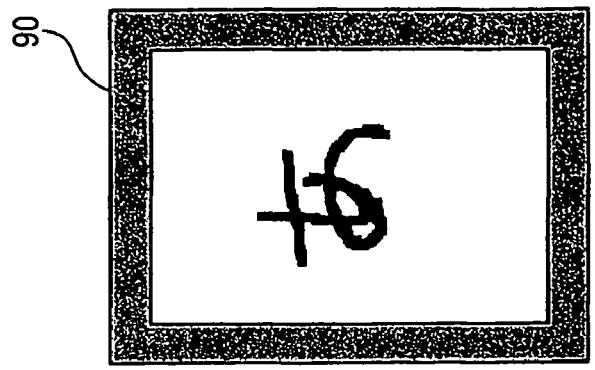
FIG. 7C
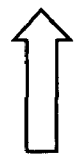
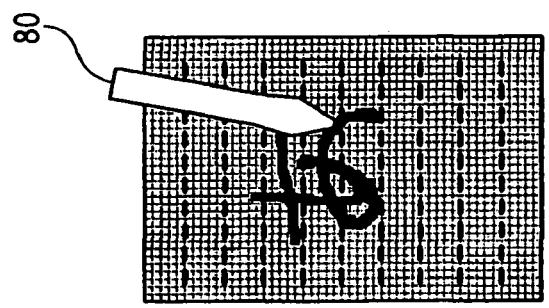
FIG. 7B
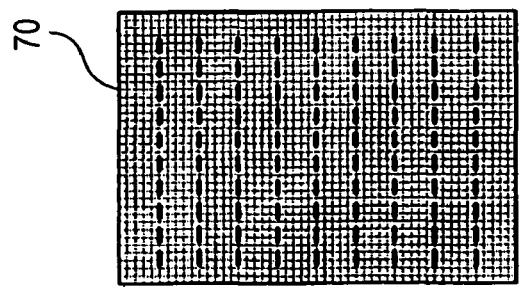
FIG. 7A

*FIG. 10A* *FIG. 10B*
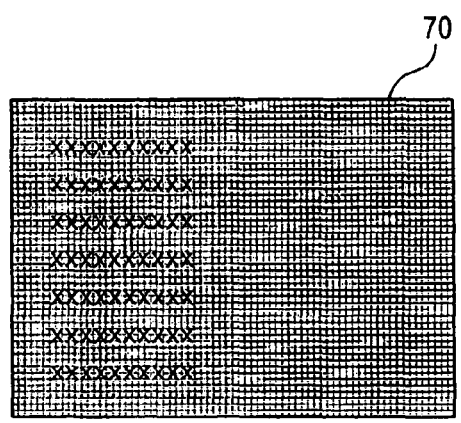
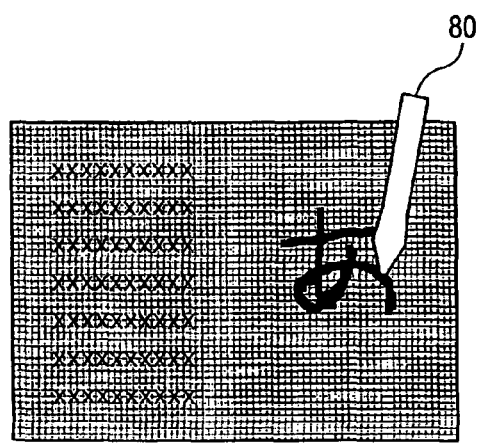
*FIG. 10C*
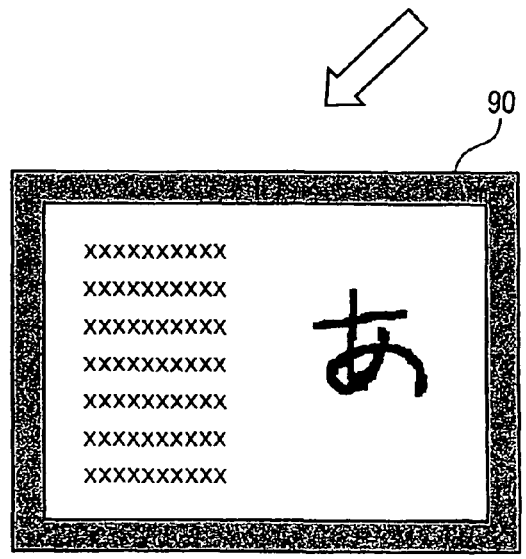

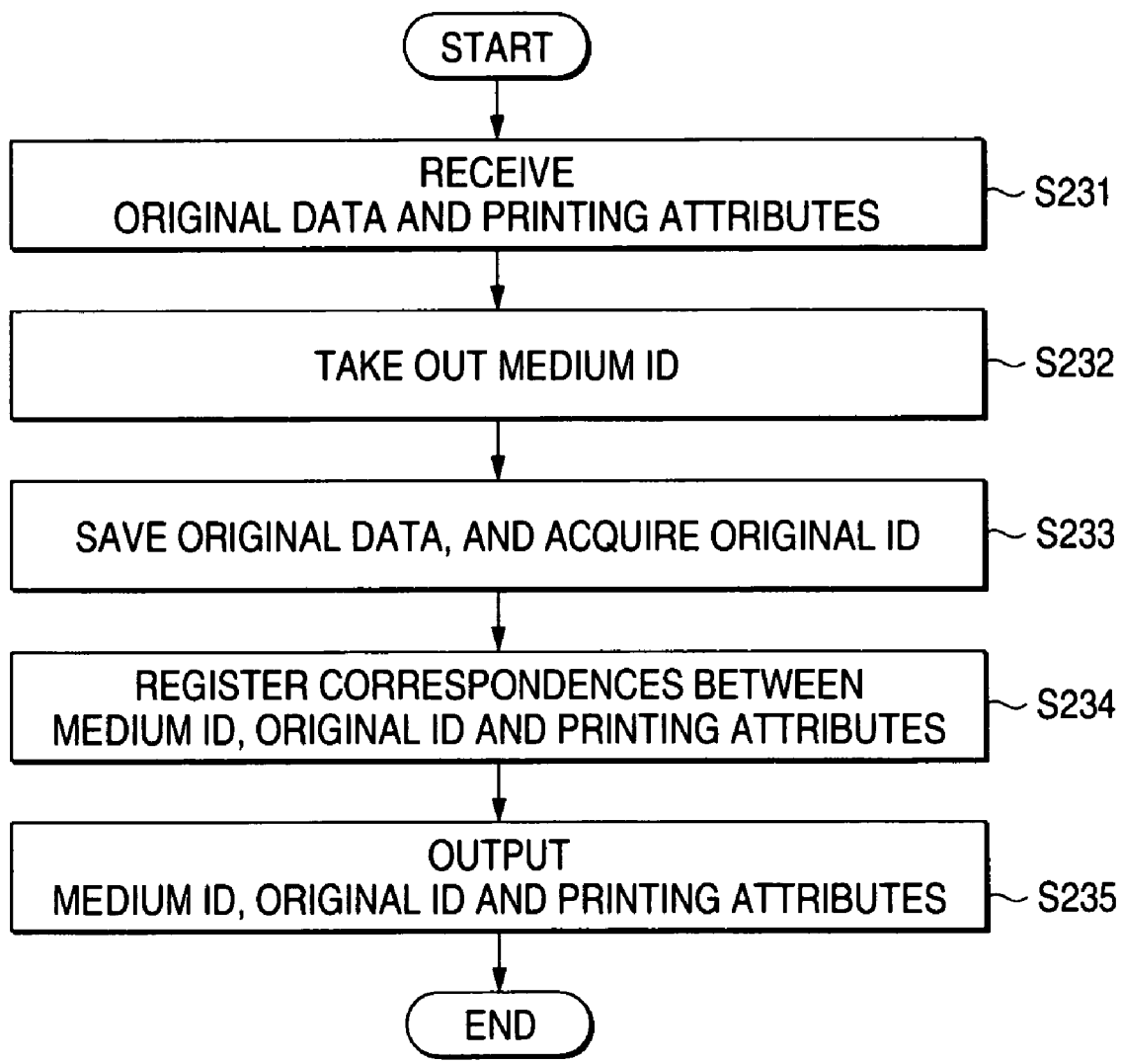

FIG. 12

| MEDIUM ID | ORIGINAL ID | SIZE | LONGITUDINAL/ LATERAL | N-UP |
|---|---|---|---|---|
| 00000001 | img00001 | A4 | LATERAL | 2 |
| 00000002 | img00002 | A4 | LONGITUDINAL | 4 |
| 00000003 | img00003 | A4 | LATERAL | 2 |
| 00000004 | img00004 | A4 | LONGITUDINAL | 4 |
| 00000005 | img00005 | A4 | LATERAL | 2 |
| ⋮ | ⋮ | ⋮ | ⋮ | ⋮ |

IMAGE FORMING APPARATUS, IMAGE PROCESSING APPARATUS, PRINTING MEDIUM, IMAGE PROCESSING METHOD AND STORAGE MEDIUM READABLE BY COMPUTER

BACKGROUND OF THE INVENTION

1. Field of the Invention

The present invention relates to an image forming apparatus such as a copying machine, a printer, or the like, an image processing apparatus for generating an image that is to be printed by the image forming apparatus, and the like.

2. Description of the Related Art

Recently much attention is focused on the technology that makes it possible to draw characters or pictures on a special sheet of paper on which fine dots have already been printed, then transfer data such as the characters, or the like written on this paper by the user to the personal computer, the cellular phone, or the like, and then save the contents of the data or send the mail. According to this technology, small dots are printed on this special sheet of paper with about 0.3 mm spacing, for example, and totally different patterns are drawn in every grid of a predetermined size, for example. The position of the character, or the like written on this special sheet of paper can be identified by reading this pattern by virtue of a dedicated pen in which a digital camera is built, for example. Thus, such character, or the like can be utilized as electronic information.

According to a related art, a technology to print the document stored electronically on a sheet of paper on which positions coding patterns are provided is present. In the related art, the special sheet of paper having the positions coding patterns thereon is also employed. According to the related art, the document is printed on this sheet of paper and then is edited manually thereon by using a digital pen, which has a means for reading the positions coding patterns, and a pen point, which is used to put the marking on a surface of the paper, such that the edited result is reflected on the electronic information.

SUMMARY OF THE INVENTION

Meanwhile, an action of taking a note by handwriting is found in various scenes such as the conference, the personal desk, and others. In such scene, electronization of the handwritten memo can be easily carried out if the special sheet of paper according the related art can be employed.

However, there is no small number of chances that a person must take a note hastily even though such person does not carry such special sheet of paper with him or her. In such case, when the person employs the ordinary memo paper, the information handwritten on the memo paper cannot be simply electronized. When the person does not has even the ordinary memo paper at hand, sometimes such person picks out a sheet of plain copying paper from a near copying machine, for example, and uses it.

In this way, such a situation is very convenient that the person can obtain a plain memo paper having the position coding pattern thereon from the near copying machine. However, according to the related art, the sheet of paper to which the position coding pattern is provided is still employed. In addition, no effective means to obtain conveniently the above memo paper is provided.

The present invention has been made in view of the above circumstances and provides image forming.

According to an aspect of the invention, an image forming apparatus comprises a document image generating portion that generates a document image which is instructed to be printed, a code image generating portion that generates a code image indicating a position on a medium; an accepting portion that accepts information indicating at least one of a first mode and a second mode, wherein a print image including the document image and the code image being printed in the first mode and a print image including the code image but not including the document image being printed in the second mode; and a printing portion that prints the print image on the medium in the mode pointed by information that the accepting portion accepts.

According to another aspect of the invention, an image processing apparatus comprises a position code generating portion that generates a position code indicating a position on a medium, and a pattern image generating portion that generates a pattern image which corresponds to at least the position code, the pattern image including a particular portion which has a visible attribute and a remaining portion which has a substantially invisible attribute.

According to another aspect of the invention, an image processing apparatus, comprising: a document image generating portion that generates a document image which is indtructed to be printed; a code image generating portion that generates a code image that indicates a position on a medium; and an image synthesizing portion that generates a print image that has a first area which includes the document image and the code image and a second area which does not include the document image but includes the code image.

According to another aspect of the invention, a printing medium comprising: a code image that indicates a position on a medium; wherein a particular portion of the code image has a visible attribute, and a remaining portion of the code image has a substantially invisible attribute.

According to another aspect of the invention, an image processing method, comprising: acquiring mode information regarding a type of a printed matter; and executing at least one of a process of generating a print image that includes both a document image which is instructed to be printed and a code image indicating a position on a medium, and process of generating a print image that includes the code image indicating the position of the medium without receiving a printing instruction of the document image, in response to the mode information.

According to another aspect of the invention, a storage medium is readable by a computer and storing a program of instructions executable by the computer to perform a function for generating a print image, the function comprises: acquiring mode information regarding a type of a printed matter; and executing at least one of a process of generating a print image that includes a document image which is instructed to be printed and a code image indicating a position on a medium, and a process of generating a print image that includes the code image indicating the position of the medium without receiving a printing instruction of the document image, in response to the mode information.

BRIEF DESCRIPTION OF THE DRAWINGS

Embodiments of the present invention will be described in detail based on the following figures, wherein:

FIGS. 2A-2C is a view explaining an outline of a first embodiment of the present invention;

FIG. 3 is a block diagram showing a functional configuration of an image processing apparatus according to the embodiments;

FIGS. 6A-6C are views explaining a two-dimensional code image that is printed on a medium according to the embodiments;

FIGS. 7A-7C are views explaining an outline of a second embodiment of the present invention;

FIGS. 10A-10C are views explaining an outline of a third embodiment of the present invention.

FIG. 11 is a flowchart showing an operation of a corresponding information managing portion according to the third embodiment;

FIG. 12 is a view showing an example of contents of corresponding information DB in according to the embodiments.

DESCRIPTION OF THE EMBODIMENTS

Embodiments will be explained in detail with reference to the accompanying drawings hereinafter.

Figure 1:
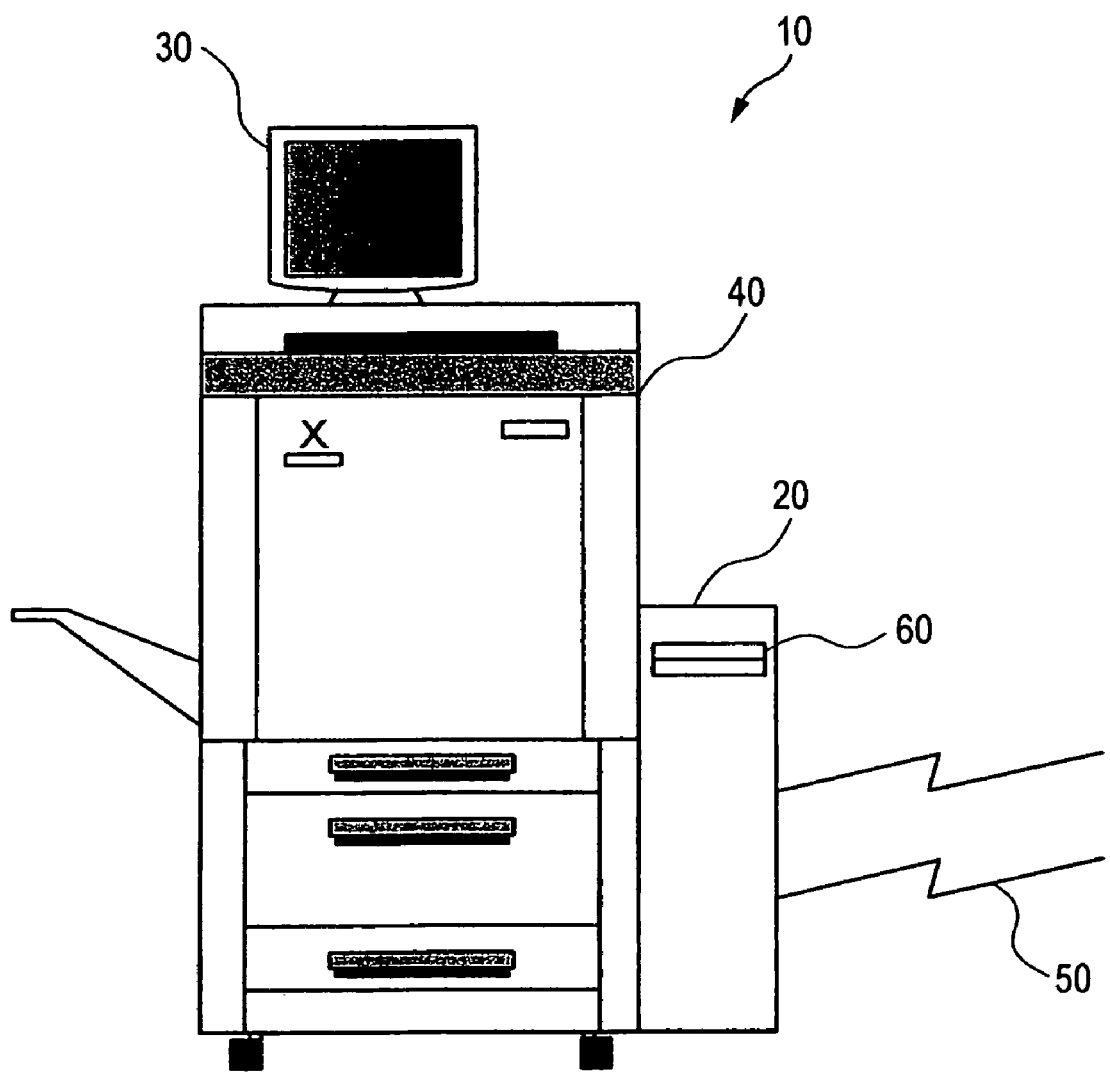
FIG. 1 is a view showing an external appearance of an image forming apparatus according to embodiments of the present invention.

FIG. 1 is a view showing an external appearance of an image forming apparatus 10 to which an embodiment of the present invention is applied.

As shown in FIG. 1, the image forming apparatus 10 according to the embodiments includes an image processing apparatus 20 for processing input image data to generate an image, an inputting/outputting device 30 used as an operation panel used to choose various functions of the image forming apparatus 10, or the like, and an apparatus main body 40 as a printing portion that expands and prints the image generated by the image processing apparatus 20 on a medium such as a paper, or the like. Also, a communication device 50 acting as a communicating means connected to an external equipment, and a slot 60 into which a portable recording medium like the optical disk such as various DVDs (Digital Versatile Discs), various CD, or the like, various memory cards, and the like is detachably inserted are provided.

The image processing apparatus 20 is a computer system such as a personal computer (PC), a server, or the like, and has a drive device to read the data from various recording media.

The inputting/outputting device 30 has a display such as a liquid crystal display (LCD), or the like, for example. An inputting function as the user interface can be provided to a surface of the display by forming a touch panel, for example. When the function of the touch panel is not provided, an input panel (not shown), a pointing device, or the like may be provided separately to an upper surface of the apparatus main body 40, or the like in such a way that the user can input the operation command into the inputting/outputting device 30.

The apparatus main body 40 acts as a printer that can form toner images based on the input image data in the electrophotography system, for example, and get a print image in full color. Also, the apparatus main body 40 acts as a digital copying machine that has a scanner and outputs the image data read by this scanner. In addition, the apparatus main body 40 acts as a facsimile that transmits the image data read by the scanner via the telephone line, and also outputs the image data received from other equipment via the telephone line.

The communication device 50 has cables, for example, and can get information of the equipment connected to these cables and the image data. Also, the communication device 50 can carry out the two-way communications through which the command issued from the image processing apparatus 20 can be transmitted to the equipment connected to these cables. As the available interface standard, there are USB (Universal Serial Bus), IEEE1394 (Institute of Electrical and Electronic Engineers 1394), SCSI (Small Computer System Interface), and the like. In addition to the case the cable is provided, only the interface connectors that make permit the user to utilize these data transmission systems may be provided. It is preferable that the coloring should be applied to the cables of the communication device 50 every communication function, for example, to make the user's identification easy. Also, it is preferable that the tag on which the name such as USB, IEEE1394, and the like is written should be attached to the terminal portions to which the equipment are connected.

Then, concrete embodiments of the present invention will be explained hereunder.

First Embodiment

In this first embodiment, when a predetermined operation is applied to the image forming apparatus 10, a memo paper 70 on which the code image used to electronize the handwritten note is printed is output. The code image printed on this memo paper 70 is formed with the invisible toner whose absorbance in the near-infrared range is 30% or more, for example, as described later.

FIG. 2A is a view showing the memo paper 70 being output in this manner. In this Figure, the code image is shown by the shading.

Then, as shown in FIG. 2B, the character, or the like is written on the memo paper 70 by a pen device 80. The pen device 80 has a light irradiating portion for irradiating the infrared light, and a light receiving portion for receiving the infrared light, although not shown. The code image is read by these mechanisms. In other words, depending on whether or not the light receiving portion received a reflected light of the infrared light irradiated by the light irradiating portion, it is decided whether or not the code image has already been printed, and thus the position on the medium is recognized. Then, a tac-locus of a pen point is calculated by catching the code image in the position that is slightly shifted from the position, that the pen point of the pen device 80 traces on the memo paper 70, at a predetermined interval and then correcting the position.

Accordingly, the pen device 80 can electronize the character, or the like handwritten on the memo paper 70. As shown in FIG. 2C, such character, or the like can be displayed on a display 90.

A configuration and an operation of the image forming apparatus 10 applied to output such memo paper 70 will be explained in detail hereunder.

FIG. 3 is a view showing an example of a configuration of the image processing apparatus 20 in the image forming apparatus 10.

The image processing apparatus 20 includes an instruction accepting portion 20a, a corresponding information managing portion 21, a corresponding information database (DB)

22, an information separating portion 23, a document image generating portion 24, a document image buffer 25, a code image generating portion 26, a code image buffer 27, an image synthesizing portion 28, and an image outputting portion 20b.

Also, the code image generating portion 26 has a position information coding portion 26a, a position code generating portion 26b, an identification information coding portion 26c, an identification code generating portion 26d, a code arranging portion 26g, a pattern storing portion 26h, and a pattern image generating portion 26i.

The instruction accepting portion 20a acquires a printing instruction input from the inputting/outputting device 30 (see FIG. 1) and the original data read by the scanner portion (not shown) of the image forming apparatus 10. In this case, printing attributes such as paper size, orientation, magnification, N-up (layout printing in which N pages of the electronic document are allocated to one page of the paper), duplex printing, etc. are included in the printing instruction.

The corresponding information managing portion 21 registers information into the corresponding information DB 22, and reads information from the corresponding information DB 22.

The corresponding information DB 22 is a database as a storing portion to store a correspondence between the identification information to identify the medium (referred to as a "medium ID" hereinafter) and the identification information of the original data as a source of document image to be printed on the medium (referred to as an "original ID" hereinafter).

The information separating portion 23 separates the information transferred from the corresponding information managing portion 21 into information necessary for generation of the document image and information necessary for generation of the code image.

The document image generating portion 24 converts the original data into the image based on the information necessary for generation of the document image that is separated by the information separating portion 23, and stores the image in the document image buffer 25.

The code image generating portion 26 generates the code image based on the information necessary for generation of the code image that is separated by the information separating portion 23, and stores the image in the code image buffer 27.

The image synthesizing portion 28 synthesizes the document image stored in the document image buffer 25 and the code image stored in the code image buffer 27.

The image outputting portion 20b outputs the instruction to output the image synthesized by the image synthesizing portion 28 to the apparatus main body 40 (see FIG. 1).

The position information coding portion 26a encodes the position information based on a predetermined coding system. In this encoding, a RS (Reed-Solomon) code or a BCH code that is an already-known error correction code, for example, can be employed. Also, as the error correction code, a CRC (Cyclic Redundancy Check) or a check sum value of the position information can be calculated and then the value can be added to the position information as a redundant bit. Also, an M-sequence code as a type of the pseudo noise sequence can be utilized as the position information. In the M-sequence code, the coding is executed by utilizing such a characteristic that, when a partial sequence of a length P is picked out from the M-sequence of degree P (sequence length $2^{P-1}$), the bit pattern that appears in that partial sequence appears only once in the M-sequence.

The position code generating portion 26b converts the coded position information into the format embedded as the code information. For example, in order to render the decryption made by a third person difficult, the arrangement of respective bits in the coded position information can be replaced or encrypted based on the pseudo-random numbers, or the like. Also, when the position codes are two-dimensionally arranged, the bit values are two-dimensionally arranged like the arrangement of codes.

The identification information coding portion 26c when receives the identification information encodes the identification information based on a predetermined coding system. In this coding, the similar system to that used in coding the position information can be employed.

The identification code generating portion 26d converts the coded identification information into the format embedded as the code information. For example, in order to render the decryption made by a third person difficult, the arrangement of respective bits in the coded identification information can be replaced or encrypted based on the pseudo-random numbers, or the like. Also, when the identification codes are two-dimensionally arranged, the bit values are two-dimensionally arranged like the arrangement of codes.

The code arranging portion 26g synthesizes the coded position information and the coded identification information, both have been arranged in the same format as the code, to generate a two-dimensional code arrangement that corresponds to an output image size. At this time, a code derived by coding different position information depending on the arrangement position is used as the coded position information, and a code derived by coding the same information irrespective of the position is used as the coded identification information.

The pattern image generating portion 26i checks bit values of arrangement elements in the two-dimensional code arrangement, acquires bit pattern images corresponding to respective bit values from the pattern storing portion 26h, and outputs the image as the code image derived by converting the two-dimensional code arrangement into the image.

In this case, these functional portions can be realized when software and hardware resources are operated jointly mutually. More concretely, the CPU (not shown) of the image processing apparatus 20 carries out the processes by reading the programs from an external memory device to a main memory device. These programs can attain respective functions of the instruction accepting portion 20a, the corresponding information managing portion 21, the information separating portion 23, the document image generating portion 24, the code image generating portion 26, the image synthesizing portion 28, and the image outputting portion 20b.

Next, an operation taken when the image processing apparatus 20 outputs the image to the apparatus main body 40 in response to the instruction issued from the inputting/outputting device 30 will be explained hereunder.

In the image processing apparatus 20, first the instruction accepting portion 20a accepts the printing instruction from the inputting/outputting device 30. At that time, mode information indicating either of a normal mode in which the code image is printed on the document image to be superposed thereon and a blank-sheet-of-paper mode in which the memo paper 70 on which only the code image is printed is output is included in the printing instruction. Then, the instruction accepting portion 20a transfers the received information to the corresponding information managing portion 21.

Figure 4:
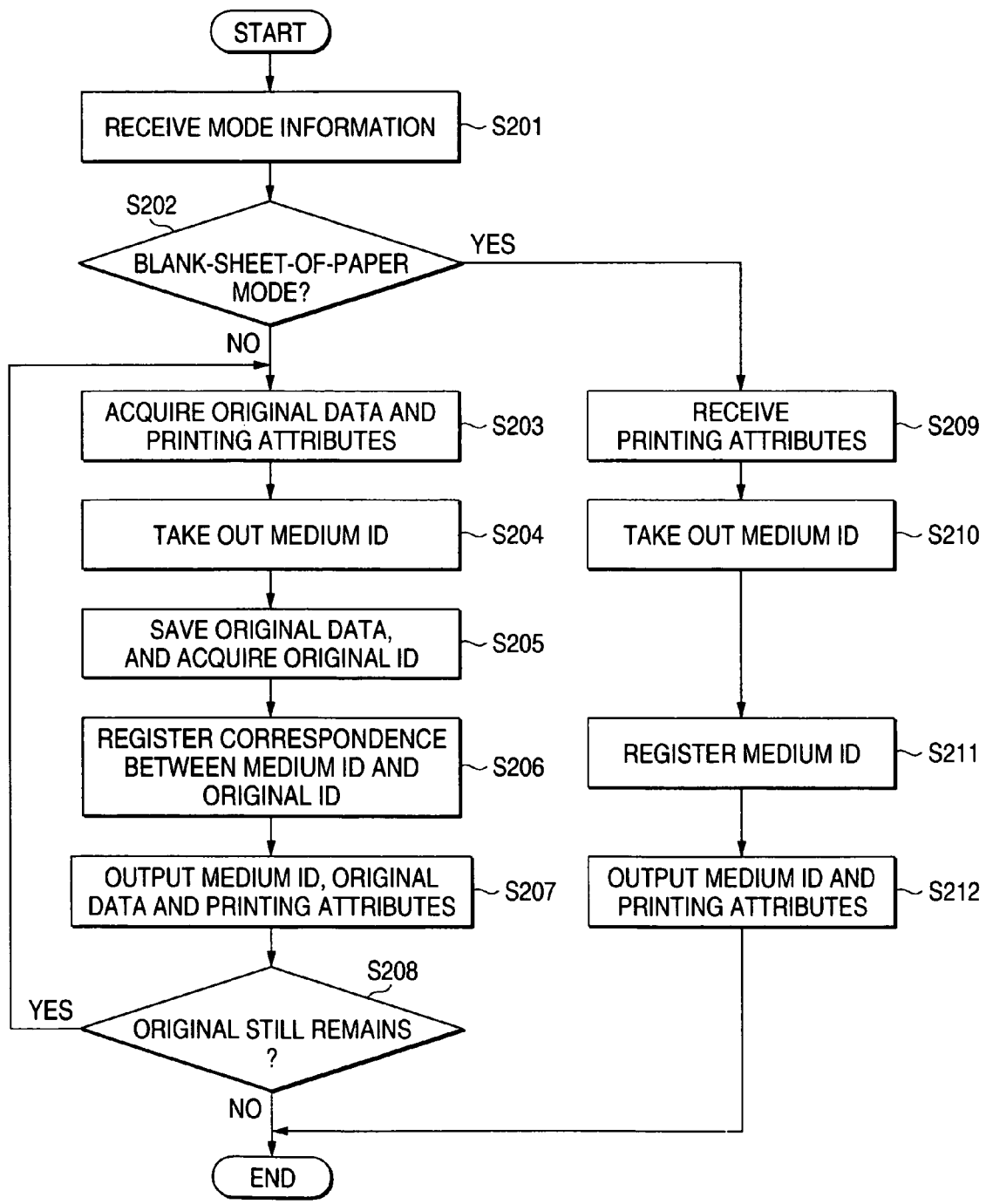
FIG. 4 is a flowchart showing an operation of a corresponding information managing portion according to the first embodiment.

Accordingly, the corresponding information managing portion 21 carries out the processes shown in FIG. 4.

In other words, the corresponding information managing portion 21 receives the mode information from the instruction accepting portion 20a (step 201). Then, the corresponding information managing portion 21 decides whether or not the mode information indicates the blank-sheet-of-paper mode (step 202).

As a result, when the mode information does not indicate the blank-sheet-of-paper mode, i.e., indicates the normal mode, the corresponding information managing portion 21 acquires the original data and the printing attributes from the instruction accepting portion 20a (step 203). Here, the original data read by the scanner (not shown) of the image forming apparatus 10, for example, may be used as the original data. That is, the corresponding information managing portion 21, when receives the mode information indicating the normal mode, calls upon the user to set the original to be printed and copy it, and also acquires the original data being scanned-in correspondingly in step 203.

Also, the corresponding information managing portion 21 takes out the identification information as the medium ID from an identification information managing portion (not shown) (step 204). Then, the corresponding information managing portion 21 saves the original data in a memory in the image processing apparatus 20, and then acquires a memory address, for example, as the original ID (step 205).

Then, the corresponding information managing portion 21 registers a correspondence between the medium ID and the original ID in the corresponding information DB 22 (step 206). Then, the corresponding information managing portion 21 outputs the medium ID, the original data, and the printing attributes to the information separating portion 23 (step 207).

Finally, the corresponding information managing portion 21 decides whether or not the unprocessed original still remains (step 208). If Yes, the process goes to step 203. If No, the process is ended.

In contrast, in step 202, if the mode information indicates the blank-sheet-of-paper mode, the corresponding information managing portion 21 acquires the printing attributes (step 209).

Also, the corresponding information managing portion 21 takes out the identification information used as the medium ID from the identification information managing portion (not shown) (step 210).

Then, the corresponding information managing portion 21 registers the medium ID in the corresponding information DB 22 (step 211). Here, although it is not intended to correlate the medium ID with the original ID like step 206, the medium ID is registered to make sure of the fact that such medium ID has been allocated to the memo paper 70. Then, the corresponding information managing portion 21 outputs the medium ID and the printing attributes to the information separating portion 23 (step 212).

Then, the image processing apparatus 20 is operated as follows.

The information separating portion 23 separates the transferred information into the information necessary for the code image generation (the medium ID and the printing attributes) and the information necessary for the document image generation (the original data), and outputs the former to the code image generating portion 26 and outputs the latter to the document image generating portion 24.

Accordingly, the medium address is coded by the position information coding portion 26a, and the position code indicating the coded medium address is generated by the position code generating portion 26b. Also, the medium ID is coded by the identification information coding portion 26c, and the identification code indicating the coded medium ID by the identification code generating portion 26d.

Then, the two-dimensional code arrangement corresponding to an output image size is generated by the code arranging portion 26g, and the pattern image corresponding to the two-dimensional code arrangement is generated by the pattern image generating portion 26i.

Meanwhile, the document image generating portion 24 generates the document image from the original data.

Finally, the document image generated by the document image generating portion 24 and the code image generated previously by the code image generating portion 26 are synthesized by the image synthesizing portion 28. In this case, when the blank-sheet-of-paper mode is designated, the original data are not transferred to the document image generating portion 24 and therefore the document image is not accumulated in the document image buffer 25. Therefore, when the document image is not accumulated in the document image buffer 25 within a predetermined time period, the image synthesizing portion 28 generates the synthesized image only from the code image accumulated in the code image buffer 27 and transfers the image to the image outputting portion 20b.

Accordingly, the image outputting portion 20b sends out the output instruction of the synthesized image to the apparatus main body 40.

The apparatus main body 40 prints the synthesized image of the document image and the code image in response to this image output instruction. In this way, in the case of the blank-sheet-of-paper mode, the user may get the memo paper 70.

Next, the apparatus main body 40 of the image forming apparatus will be explained in detail hereunder.

Figure 5:
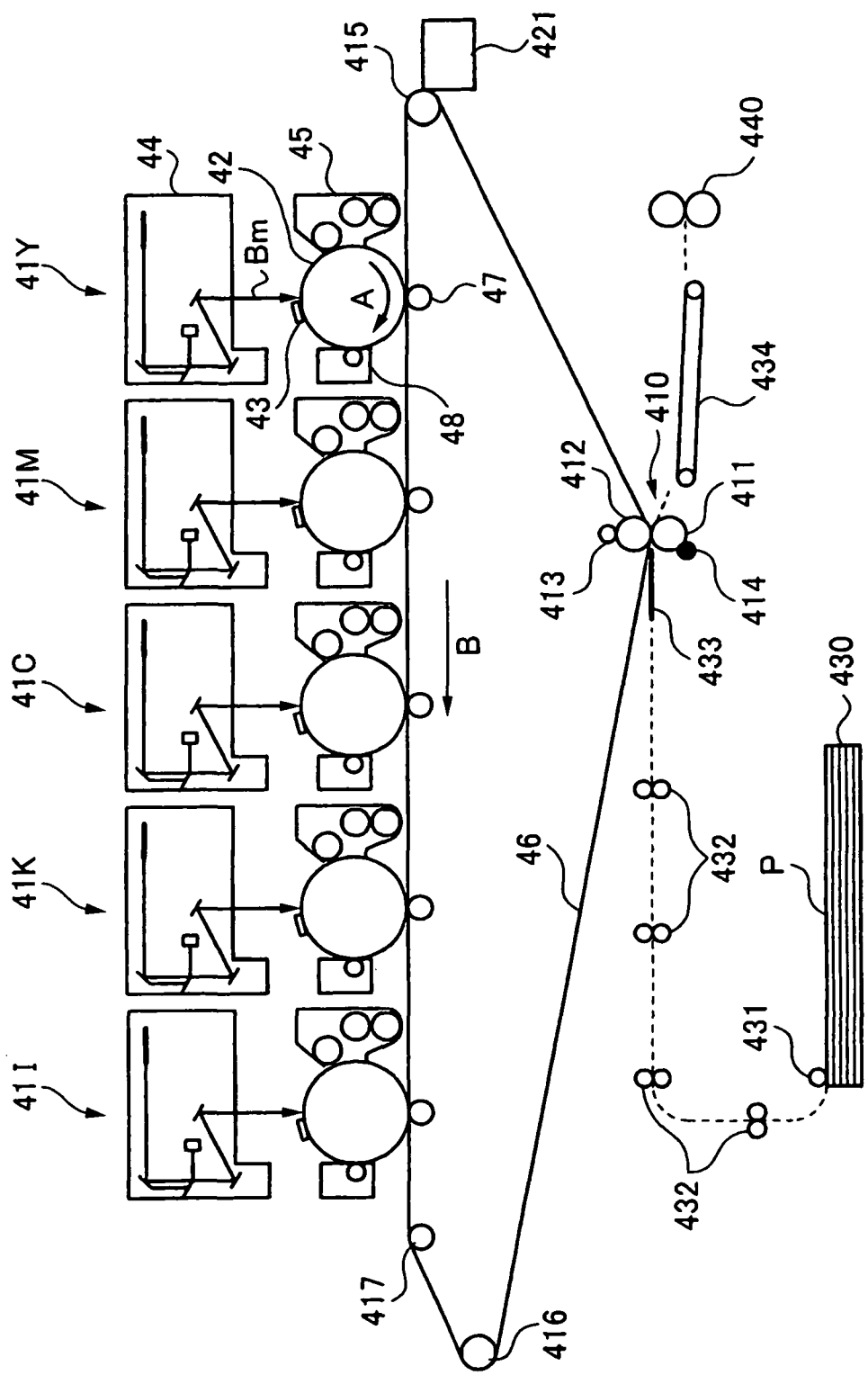
FIG. 5 is a view showing a configurative example of a main body of the image forming apparatus according to the embodiments.

FIG. 5 is a view showing a configurative example of the apparatus main body 40. The apparatus main body 40 shown in FIG. 5 is the so-called tandem type system. For example, this apparatus main body 40 includes a plurality of image forming units 41 (41Y, 41M, 41C, 41K, 41I) on which the toner image in each color component is formed in the electrophotography system, an intermediate transfer belt 46 for transferring (primarily transferring) the toner image formed by the image forming units 41 in each color component sequentially to retain, a secondary transfer unit 410 for simultaneously transferring (secondarily transferring) the superposed image transferred on the intermediate transfer belt 46 on the paper (medium) P, and a fixing unit 440 for fixing the secondarily transferred image on the paper P.

In this apparatus main body 40, in addition to the image forming units 41Y, 41M, 41C that form the toner image in yellow (Y), magenta (M), cyan (C) as the usual color (normal color) respectively, the image forming unit 41K for forming the toner image in black (K), which does not have an absorption in the infrared range, and the image forming unit 41I for forming the invisible toner image are provided as one of the image forming units constituting the tandem system.

Also, the coloring material, which has a larger absorptance of the infrared light than Y toner, M toner, C toner, K toner used in the image forming units 41Y, 41M, 41C, 41K, is used in the image forming unit 41I. As such coloring material, there may be listed the coloring material including vanadyl naphthalocyanine, for example. In order to make the sensing of the code image easier, it is desired that the coloring material having a smaller absorptance of the infrared light than the coloring material used in the image forming unit 41I should be employed as the K toner used in the image forming unit 41K. In this case, like the coloring material including the carbon, the coloring material used commonly to absorb the infrared light may be employed.

In the present embodiment, in respective image forming units 41 (41Y, 41M, 41C, 41K, 41I), the electrophotography devices such as a charger 43 for charging the photosensitive drum, a laser exposing unit 44 for writing an electrostatic latent image onto a photosensitive drum 42 (in FIG. 5, the exposure beam is indicated by a reference Bm), a developer 45 for including each color component toner to visualize the electrostatic latent image on the photosensitive drum 42 with the toner, a primary transfer roller 47 for transferring the toner image formed on the photosensitive drum 42 in each color component onto the intermediate transfer belt 46, a drum cleaner 48 for removing a residual toner on the photosensitive drum 42, etc. are provided sequentially around the photosensitive drum 42 that is rotated in the direction indicated with an arrow A. These image forming units 41 are aligned in order of yellow (Y color), magenta (M color), cyan (C color), black (K color), and invisible (one color) from the upstream side of the intermediate transfer belt 46.

Also, the intermediate transfer belt 46 is rotated by various rollers in the direction indicated with an arrow B. As various rollers, a drive roller 415 driven by a motor (not shown) to rotate the intermediate transfer belt 46, a tension roller 416 having functions of applying apredetermined tensile force to the intermediate transfer belt 46 and preventing a zigzag movement of the intermediate transfer belt 46, an idle roller 417 for supporting the intermediate transfer belt 46, a backup roller 412 (described later) are provided.

Also, a voltage having the opposite polarity to the charged polarity of the toner is applied to the primary transfer roller 47. Accordingly, the toner image on the photosensitive drum 42 is electrostatically absorbed onto the intermediate transfer belt 46 sequentially, so that the superposed image is formed on the intermediate transfer belt 46. The secondary transfer unit 410 has a secondary transfer roller 411 that is arranged to push the toner image bearing surface side of the intermediate transfer belt 46 with pressure, and the backup roller 412 that is arranged on the back surface side of the intermediate transfer belt 46 to constitute the opposing electrode of the secondary transfer roller 411. A metal power feed roller 413, to which a secondary transfer bias is applied stably, is arranged to contact the backup roller 412. A brush roller 414 for removing the stains on the secondary transfer roller 411 is arranged to touch the secondary transfer roller 411.

Also, a belt cleaner 421 for cleaning a surface of the intermediate transfer belt 46 after the secondary transfer is provided on the downstream side of the secondary transfer roller 411.

In addition, in the present embodiment, a paper tray 430 including the paper P, a pickup roller 431 for picking up the papers P stocked in the paper tray 430 at a predetermined timing to carry, a carry roller 432 for carrying the paper P fed from the pickup roller 431, a carry shoot 433 for sending the paper P carried by the carry roller 432 into the secondary transfer position of the secondary transfer unit 410, and a carry belt 434 for carrying the paper P, which was subjected to the secondary transfer, to the fixing unit 440 are provided as the paper carrying system.

Next, an image forming process in the apparatus main body 40 will be explained hereunder. A predetermined image forming process is executed when a start switch (not shown) is turned ON by the user. In more detail, for example, in case the apparatus main body 40 is constructed as the copying machine, the digital image signal input via the scanner is stored temporarily in the memory, and then each color toner image is formed based on the digital image signals in five stored colors (Y, M, C, K, I).

In other words, the image forming units 41 (41Y, 41M, 41C, 41K, 41I) are driven based on each color image recording signal derived by the image processing respectively. Then, in respective image forming units 41Y, 41M, 41C, 41K, 41I, the electrostatic latent image is written onto the photosensitive drum 42, which was charged uniformly by the charger 43, by the laser exposing unit 44 in response to the image recording signal respectively. Also, the toner image is formed in respective colors by developing respective written electrostatic latent images by the developer 45 in which respective color toners are included.

Then, the toner images formed on respective photosensitive drums 42 are primarily transferred by the primary transfer bias, which is applied by the primary transfer roller 47, from the photosensitive drums 42 onto a surface of the intermediate transfer belt 46 in the primary transfer positions at which respective photosensitive drums 42 come into contact with the intermediate transfer belt 46. In this manner, the toner images being primarily transferred onto the intermediate transfer belt 46 are superposed on the intermediate transfer belt 46, and then carried to the secondary transfer position with the carrying of the intermediate transfer belt 46.

Meanwhile, the paper P is carried to the secondary transfer position of the secondary transfer unit 410 at a predetermined timing. Then, the paper P is nipped between the secondary transfer roller 411 and the intermediate transfer belt 46 (the backup roller 412). Then, the superposed toner images borne by the intermediate transfer belt 46 is secondarily transferred onto the paper P by an action of the secondary transfer electric field that is generated between the secondary transfer roller 411 and the backup roller 412.

Then, the paper P on which the toner image is transferred is carried to the fixing unit 440 by the carry belt 434, and the toner image is fixed. In contrast, the residual toner is removed by the belt cleaner 421 from the intermediate transfer belt 46 after the secondary transfer.

FIGS. 6A to 6C are view explaining the two-dimensional code image that is generated by the code image generating portion 26 in the image processing apparatus 20 and then printed by the apparatus main body 40. FIG. 6A is a view showing schematically the unit of the two-dimensional code image that is formed by the invisible image and arranged like a grid. Also, FIG. 6B is a view showing one unit of the two-dimensional code image the invisible image of which is recognized by irradiating the infrared light. In addition, FIG. 6C is a view explaining an oblique line pattern consisting of a backslash "\" and a slash "/".

The two-dimensional code image formed by the apparatus main body 40 is formed by the invisible toner whose maximum absorptance in the visible range (400 nm to 700 nm) is 7% or less and whose absorptance in the near-infrared range (800 nm to 1000 nm) is 30% or more, for example. Also, the invisible toner whose mean disperse diameter ranges within a range of 100 nm to 600 nm is employed to enhance a near-infrared light absorbing capability necessary for the image machine reading. Here, "visible" and "invisible" are not relevant to whether or not the image can be recognized with the eyes. The "visible" and "invisible" are discriminated depending on whether or not the image formed on the printed medium can be recognized based on the color development property that is caused due to an absorption of a particular wavelength in the visible light range.

The two-dimensional code image shown in FIGS. 6A to 6C is formed as the invisible image that the machine reading and the decoding process of which can be executed stably by irradiating the infrared light for a long term and in which the information can be recorded at a high density. Also, it is preferable that the invisible image that can be provided in any area regardless of the surface area of the image outputting medium, in which the visible image is provided, should be employed. In the present embodiment, the invisible image is formed on the whole surface of the medium (sheet of paper) to coincide with a size of the printed medium. Also, it is further preferable that the invisible image that can be recognized by a gross difference when viewed with the eyes should be employed. In this case, the "whole surface" does not mean that all four corners of the paper are included. Since normally the periphery of the sheet of paper is the nonprinting area in the system such as the electrophotography system, or the like, there is no necessity to print the invisible image in such area.

The two-dimensional code pattern shown in FIG. 6B includes an area in which the position code indicating the coordinate position on the medium is stored and an area in which the identification code used to identify uniquely the medium is stored. Also, the two-dimensional code pattern also includes an area in which the synchronizing code is stored. Then, as shown in FIG. 6A, the two-dimensional code in which different position information are stored on the whole surface of the medium (sheet of paper) to coincide with a size of the printed medium is arranged like a grid by arranging a plurality of two-dimensional code patterns. Also, the two-dimensional code pattern shown in FIG. 6B is arranged in plural on the overall medium, and each pattern has the position code, the identification code, and the synchronizing code. Then, different position information are stored in plural position code areas according to the arranged locations respectively. In contrast, the same identification information is stored in plural identification code areas irrespective of the arranged locations.

In FIG. 6B, the position code is arranged in the rectangular area of 6 bit×6 bit. Each bit value is formed by a plurality of fine line bit maps whose rotation angles are made different, and a bit value 0 and a bit value 1 are expressed by the oblique line patterns (pattern 0 and pattern 1) shown in FIG. 6C. More particularly, the bit 0 and the bit 1 are expressed by using the backslash "\" and the slash "/" that has a different inclination mutually. The oblique line pattern is constructed to have a size of 8×8 pixels by using 600 dpi, and the left-upward inclined line pattern (pattern 0) represents the bit value 0 and the right-upward inclined line pattern (pattern 1) represents the bit value 1. Therefore, 1-bit information (0 or 1) can be expressed by one oblique line pattern. Because the fine line bit maps consisting of two types of inclination are employed, the two-dimensional code pattern in which the noise that affects the visible image may be reduced very small and in which a large quantity of information may be digitally embedded at a high density may be provided.

That is, the 36-bit position information are stored in total in the position code area shown in FIG. 6B. Out of 36 bits, 18 bits can be used to encode the X-coordinate, and 18 bits can be used to encode the Y-coordinate. When all 18 bits are used in the position coding, the position can be coded in $2^{18}$ ways (about two hundred and forty thousand ways). When each oblique line pattern is constructed by 8 pixel×8 pixel (600 dpi) as shown in FIG. 6C, a size of the two-dimensional code (including the synchronizing code) in FIG. 6B is given as about 3 mm (8 pixel×9 bit×0.0423 mm) in both the longitudinal and lateral directions because one dot of 600 dpi is 0.0423 mm. When the position is coded at 3 mm spacing in two hundred and forty thousand ways, a length of about 786 m can be coded. In this manner, all 18 bits may be used to code the position, otherwise a redundant bit used for the error detection or the error correction may be included when the oblique line pattern sensing error is generated.

Also, the identification code is arranged in the rectangular are of 2 bit×8 bit and 6 bit×2 bit, and 28-bit identification code can be stored in total. When 28 bits are used as the identification code, the identification information can be expressed in $2^{28}$ ways (about two hundred and seventy million ways). Like the position code, a redundant bit used for the error detection or the error correction may also be included in 28 bits of the identification code.

In the example shown in FIG. 6C, two oblique line patterns are different in angle by 90 degree mutually. Four types of oblique line patterns can be constructed when an angle difference is set to 45 degree. When constructed in this manner, 2-bit information (0 to 3) can be expressed by one oblique line pattern. That is, the number of available bits can be increased by increasing the angle type of the oblique line pattern.

Also, in the example shown in FIG. 6C, the bit value coding is explained by using the oblique line pattern. But the selectable pattern is not limited to the oblique line pattern. The dot ON/OFF or the method of coding the dot position according to the direction shifted from the reference position may be employed.

With the above, explanation of the first embodiment is ended.

In this manner, in the present embodiment, in addition to the normal mode in which the printed matter on which the document image and the code image are superposed is output, the mode in which the memo paper on which only the code image is printed is output is provided. According to such configuration, the memo paper that is able to electronize the handwritten note is readily available.

In the present embodiment, in the normal mode, the document image generated from the scanned original data and the code image are synthesized and printed. In this case, the document image of the electronic document requested by PC to print and the code image may be synthesized and printed.

Also, in the blank-sheet-of-paper mode, the plain memo paper is output. In this case, it is not intended to exclude the memo paper on which the pattern that does not act as an obstacle in taking a note, or the like is printed.

In addition, in the present embodiment, the medium ID is included in the code information that is printed on the medium. In this case, when the memo paper 70 is used only for the electronization of the note, the medium ID is not always included.

Second Embodiment

In this second embodiment, the character, the symbol, the figure, or the like such as the border, or the like, which is available for the handwriting of the character, or the like, is printed on the memo paper 70 that is output in the first embodiment. At that time, in the present embodiment, the image such as the character, the symbol, the figure, etc. is not formed separately from the code image, but the image such as the character, the symbol, the figure, or the like is formed as apart of the code image. That is, in the first embodiment, all the code images are printed by the invisible toner. In the present embodiment, portions constituting the border, etc. of the code image are printed by the visible toner.

FIG. 7A is a view showing the memo paper 70 output in this manner. In this Figure, the code image is shown by the shading and the border is indicated by a broken line.

Then, as shown in FIG. 7B, the character, or the like is written on the memo paper 70 by the pen device 80. The pen device 80 calculates a tac-locus of the pen point by the mechanism described in the first embodiment.

Accordingly, the pen device 80 can electronize the character, or the like handwritten on the memo paper 70. As shown in FIG. 7C, the character, or the like can be displayed on the display 90.

A configuration and an operation of the image forming apparatus 10 used to output such memo paper 70 will be explained in detail hereunder.

Since the configuration of the image processing apparatus 20 is almost similar to that described in the first embodiment, its detailed explanation will be omitted herein. Also, the operation taken until the document image generating portion 24 generates the document image and stores the image in the document image buffer 25 and the pattern image generating portion 26i generates the pattern image corresponding the two-dimensional code arrangement and after image synthesizing portion 28 synthesizes the document image and the code image is similar to that described in the first embodiment. Merely the processing contents of the pattern image generating portion 26i are different from the first embodiment.

In other words, in the first embodiment, the pattern image generating portion 26i generates the pattern image only. In the present embodiment, the pattern image generating portion 26i not only generates the pattern image but also executes a process of changing a part of the attributes of the generated pattern image from the invisible range to the visible range.

Figure 8:
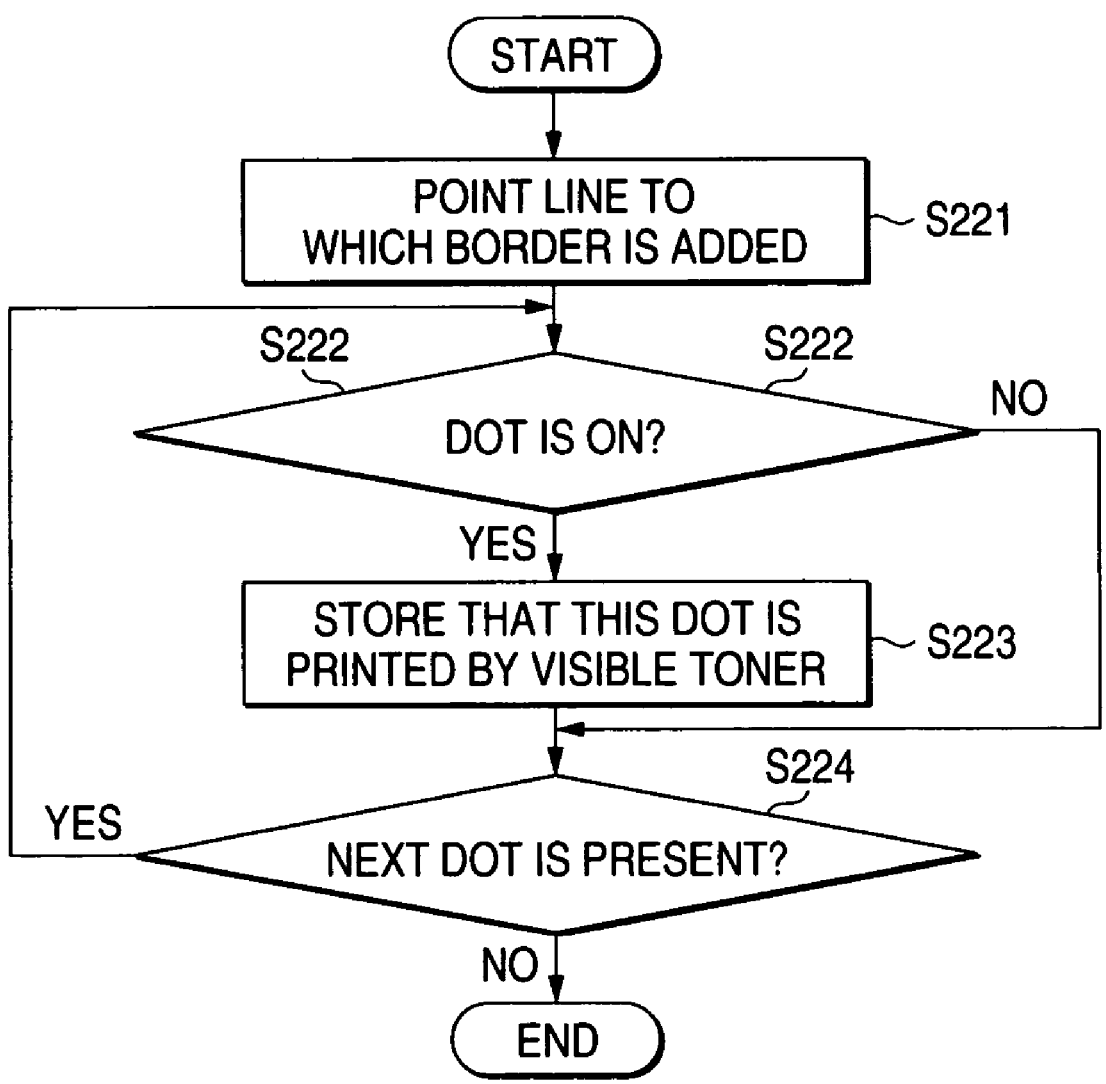
FIG. 8 is a flowchart showing an operation of a pattern image generating portion according to the second embodiment.

FIG. 8 is a flowchart showing an operation of the pattern image generating portion 26i in the present embodiment. Here, the operation will be explained by taking the case where the border is drawn in the lateral direction as an example.

In the pattern image that is printed on a sheet of medium that is expanded on a predetermined memory, the pattern image generating portion 26i first points an index indicating a line as the object of process onto a line along which a border is drawn (step 221). Then, processes in steps 222 to 224 are applied to respective dots while scanning that line in the lateral direction.

In other words, the pattern image generating portion 26i decides whether or not the target dot is turned ON (step 222). Here, "the target dot is turned ON" means that the image can be formed on that dot.

As a result, if the target dot is turned ON, the visible attributes are attached to this dot. That is, it is stored that this dot is printed by the visible toner (step 223). In contrast, if the target dot is not turned ON, the process goes to step 224 to execute nothing.

Finally, the pattern image generating portion 26i decides whether or not the next dot is present (step 224). As a result, the process goes to step 222 if the next dot is present, while the process is ended if the next dot is not present.

When the above processes are applied to all lines, the visible attributes are attached to the portions constituting the border out of the code image.

Next, this process will be explained by taking the concrete code image as an example hereunder.

Figure 9:
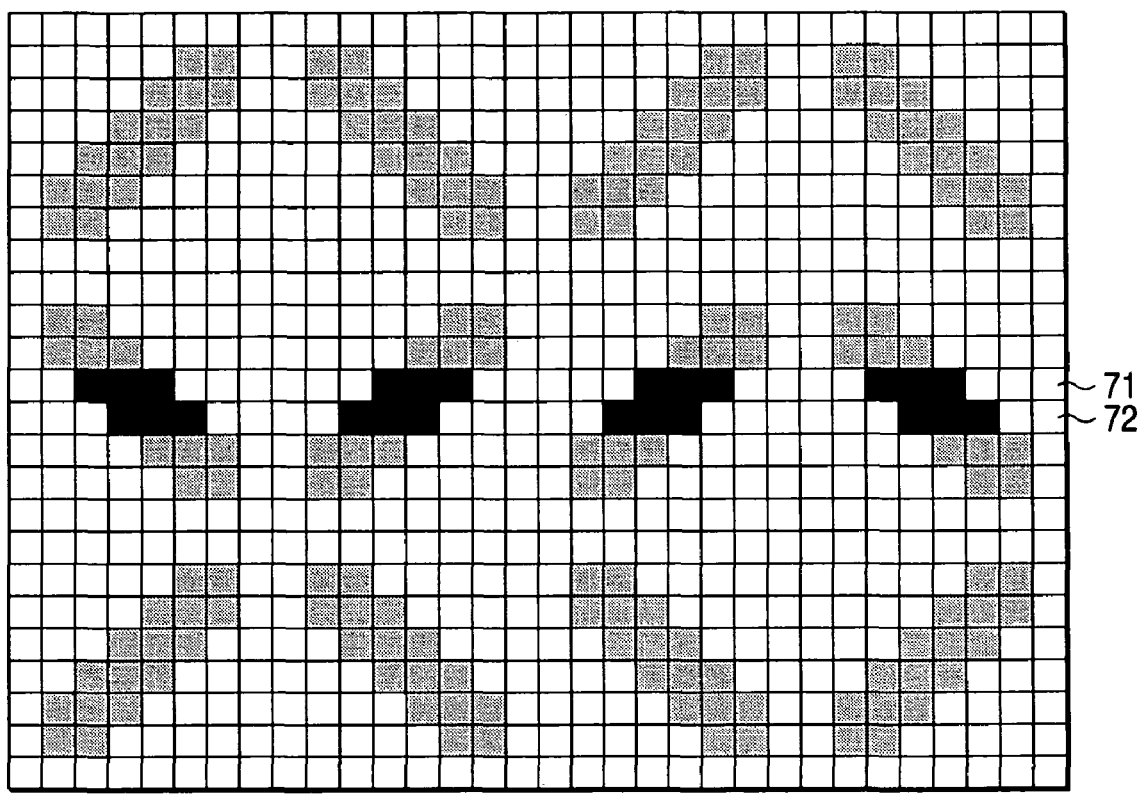
FIG. 9 is a view explaining a change of attributes of the pattern image according to the second embodiment.

FIG. 9 shows an area of a size having four patterns in the lateral direction and three patterns in the longitudinal direction, which is picked out from the area of the memo paper 70 in which the code image is printed. For example, suppose that the border is drawn in the lateral direction on the center portion of this area in the longitudinal direction. As already described, one dot of 600 dpi is 0.0423 mm. Therefore, if a thickness of the border is set to 0.1 mm, the lines 71 and 72 that are equivalent to two dots may be visualized. In FIG. 9, the dots to which the visible attributes are attached are indicated in black color, and the dots to which the invisible attributes are attached are indicated in gray color.

With the above, explanation of the second embodiment is ended.

In this way, in the present embodiment, in outputting the memo paper on which only the code image is printed, the image such as the character, the symbol, the figure, or the like such as the border, or the like, which is available for the handwriting of the character, or the like is also formed by using a part of the code image. According to such configuration, in the memo paper that can be used to electronize the note written by the hand, it can be facilitated to take a note by handwriting while suppressing an amount of used toner.

In the present embodiment, in the case where both the normal mode and the blank-sheet-of-paper mode are provided, explanation is made of the case where the border, or the like is printed on the memo paper being output in the blank-sheet-of-paper mode. But the present embodiment may be grasped as the case where the border, or the like is printed by rendering a part of the invisible code image visible irrespective of the mode.

Also, in the present embodiment, the medium ID is included in the code information that is printed on the medium. When the memo paper 70 is used only to electronize the memo, the medium ID is not always included.

Third Embodiment

In this third embodiment, an image of a document looked up in writing the character, or the like (referred to as a "reference document" hereinafter) is printed on the memo paper 70 being output in the first embodiment. The memo paper 70 being output in the first or second embodiment is enough when the reference document is not decided, but it-is effective to take a memo while putting the reference document aside when the reference document is decided. It may be considered to take a memo on the memo paper 70 being output in the first or second embodiment while always putting the reference document aside. In this case, when a number of materials are put on the desk, or the like, it is desired that the image of the reference document and the memo area are combined together.

FIG. 10A is a view showing the memo paper 70 being output in this manner. In this Figure, the code image is shown by the shading and the border is indicated by a broken line. Also, "X X X" on the left side indicates that the image of the reference document is printed in the left half of the memo paper 70.

Then, as shown in FIG. 10B, the characters, and the like are written onto the memo paper 70 by the pen device 80. The pen device 80 calculates a tac-locus of the pen point by the mechanism described in the first embodiment.

Accordingly, the pen device 80 can electronize the character, or the like handwritten on the memo paper 70. As shown in FIG. 10C, the character, or the like can be displayed on the display 90.

A configuration and an operation of the image forming apparatus 10 used to output such memo paper 70 will be explained in detail hereunder.

Since the configuration of the image processing apparatus 20 is almost similar to that described in the first embodiment, its detailed explanation will be omitted herein.

Next, an operation taken when the image processing apparatus 20 outputs the image to the apparatus main body 40 in response to the instruction issued from the inputting/outputting device 30 will be explained hereunder.

In the image processing apparatus 20, first the instruction accepting portion 20a accepts the printing instruction issued from the inputting/outputting device 30. At that time, the instruction accepting portion 20a also accepts the original data being input from the scanner portion (not shown) and the printing attributes (paper size, orientation, N-up, etc.) input from the inputting/outputting device 30. Then, the instruction accepting portion 20*a* transfers the received information to the corresponding managing portion 21.

Accordingly, the corresponding managing portion 21 executes processes shown in FIG. 11.

That is, the corresponding managing portion 21 receives the original data and the printing attributes from the instruction accepting portion 20*a* (step 231). Also, the corresponding information managing portion 21 takes out the identification information used as the medium ID from the identification information managing portion (not shown) (step 232). Then, the corresponding information managing portion 21 saves the original data in the memory of the image processing apparatus 20, and acquires the memory address, for example, as the original ID (step 233).

Then, the corresponding information managing portion 21 registers correspondences between the medium ID, the original ID, and the printing attributes in the corresponding information DB 22 (step 234). Then, the corresponding information managing portion 21 outputs the medium ID, the original ID, and the printing attributes to the information separating portion 23 (step 235).

Then, the image processing apparatus 20 operates as follows.

The information separating portion 23 separates the transferred information into the information necessary for the code image generation (the medium ID and the printing attributes) and the information necessary for the document image generation (the original data), and outputs the former to the code image generating portion 26 and outputs the latter to the document image generating portion 24.

Accordingly, the medium address is coded by the position information coding portion 26*a*, and the position code indicating the coded medium address is generated by the position code generating portion 26*b*. Also, the medium ID is coded by the identification information coding portion 26*c*, and the identification code indicating the coded medium ID by the identification code generating portion 26*d*.

Then, the two-dimensional code arrangement corresponding to an output image size is generated by the code arranging portion 26*g*, and the pattern image corresponding to the two-dimensional code arrangement is generated by the pattern image generating portion 26*i*.

Meanwhile, the document image generating portion 24 generates the document image from the original data.

Finally, the document image generated by the document image generating portion 24 and the code image generated previously by the code image generating portion 26 are synthesized by the image synthesizing portion 28, and transferred to the image outputting portion 20*b*. Accordingly, the image outputting portion 20*b* sends out the output instruction of the synthesized image to the apparatus main body 40.

The apparatus main body 40 prints the synthesized image of the document image and the code image in response to this image output instruction. In this way, the user may get the memo paper 70.

By the way, according to the present embodiment, it is possible to take a memo by using the memo paper 70 while referring to the reference document. In this event, such a situation is more convenient that the electronized information can be displayed or saved to have a correlation with the reference document after the contents of the memo are electronized.

Therefore, in the present embodiment, in step 234, the correspondences between the medium ID, the original ID, and the printing attributes are registered in the corresponding information DB 22. FIG. 12 is a view showing an example of the contents in the corresponding information DB 22.

The original ID (the folder name is omitted) as the storing location of the original data (reference document) in the image processing apparatus 20 is correlated with the medium ID attached to the memo paper 70. Also, when the image of the reference document and the memo area are connected and displayed, or the like, the printing attributes (paper size, orientation, N-up, and the like) are also correlated mutually to understand on which position of the overall memo paper 70 and in what size the image of the reference document should be displayed.

With the above, explanation of the third embodiment is ended.

In this manner, in the present embodiment, in outputting the memo paper on which the code image is printed, the image of the reference document is also formed. According to such configuration, in the memo paper that can be used to electronize the note written by the hand, it may be facilitated to take a note by handwriting.

In the present embodiment, in the case where both the normal mode and the blank-sheet-of-paper mode are provided, explanation is made of the case where the image of the reference document is printed on the memo paper being output in the blank-sheet-of-paper mode. But the present embodiment may be grasped as the case where the image of the reference document is printed on the memo paper, on which the code image is printed, irrespective of the mode.

Also, in the present embodiment, the image of the reference document is acquired from the scanning portion. But the image of the reference document may be acquired from the electronic document whose printing is demanded by PC.

In addition, in the present embodiment, like the second embodiment, the image such as the character, the symbol, the figure, or the like such as the border, or the like, which is available for the handwriting of the character, or the like is also formed by using a part of the code image. In such case, it is desired that the image of the border, or the like should not be formed in the area in which the document image is printed, but should be formed only in the memo area.

In the meanwhile, the first to third embodiments are explained to have independent features respectively. But the present invention can be grasped as the image forming apparatus 10 that can output selectively the memo paper 70 described in respective embodiments.

Figure 13A:
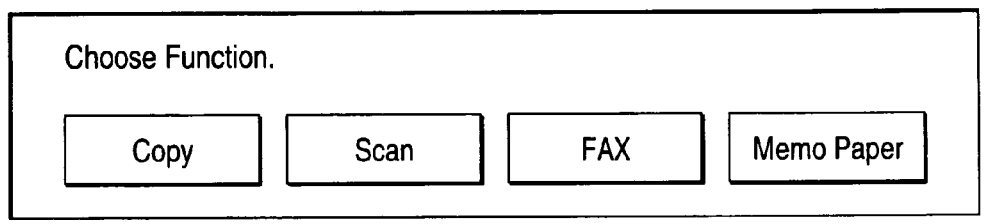
FIGS. 13A, 13B is a view showing examples of the user interface according to the embodiments.
Figure 13B:
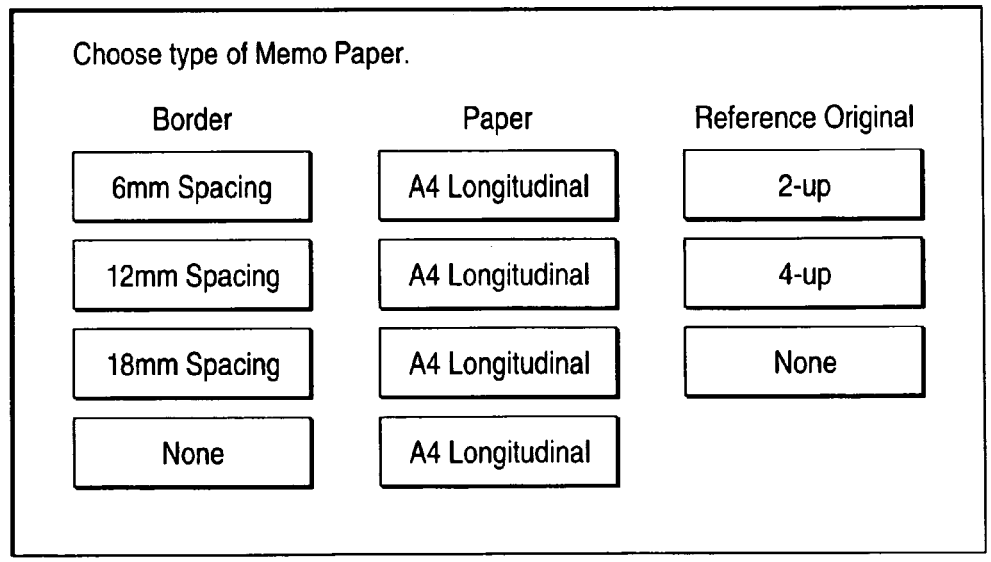

FIG. 13A, 13B show examples of the user interface in the inputting/outputting device 30 in this case.

In the initial state, a menu screen shown in FIG. 13A is displayed on the inputting/outputting device 30. The operation in the first to third embodiments is started by choosing the "memo paper" from the menu in FIG. 13A. When "copy", "scan", or "FAX" other than the "memo paper" is chosen, the chosen function is executed.

In FIG. 13A, when the "memo paper" is chosen, a menu shown in FIG. 13B is displayed. FIG. 13B shows a screen on which various settings used in outputting the memo paper are displayed. For example, as illustrated in FIG. 13B, type (or none) of the border, size and orientation of the paper, layout (or none) of the reference originals (reference documents) can be chosen.

As described above, according to an embodiment of the present invention, an image forming apparatus comprises: a document image generating portion that generates a document image which is instructed to be printed; a code image generating portion that generates a code image indicating a position on a medium; an accepting portion that accepts information indicating at least one of a first mode and a second mode, wherein a print image including the document image and the code image being printed in the first mode and a print image including the code image but not including the document image being printed in the second mode; and a printing portion that prints the print image on the medium in the mode pointed by information that the accepting portion accepts.

According to another aspect of the present invention, the code image generating portion generates the code image as a substantially invisible image.

According to another aspect of the present invention, the code image generating portion generates a particular portion of the code image as a visible image, and generates a remaining portion of the code image as a substantially invisible image.

According to another aspect of the present invention, the particular portion is a portion that forms a character, a symbol, or a figure.

According to another aspect of the present invention, accepting portion accepts information indicating at least one of the first mode and the second mode from a user interface provided to the apparatus.

According to another aspect of the present invention, the accepting portion accepts information indicating at least one of the first mode and the second mode from other apparatus via a communication line.

According to another aspect of the present invention, an image processing apparatus comprises: a position code generating portion that generates a position code indicating a position on a medium; and a pattern image generating portion that generates a pattern image which corresponds to at least the position code, the pattern image including a particular portion which has a visible attribute and a remaining portion which has a substantially invisible attribute.

According to another aspect of the present invention, the particular portion is a portion that forms a character, a symbol, or a figure.

According to another aspect of the present invention, an image processing apparatus comprises: a document image generating portion that generates a document image which is indtructed to be printed; a code image generating portion that generates a code image that indicates a position on a medium; and an image synthesizing portion that generates a print image that has a first area which includes the document image and the code image and a second area which does not include the document image but includes the code image.

According to another aspect of the present invention, the document image included in the first area is generated by reducing the document image which is instructed to be printed.

According to another aspect of the present invention, the code image generating portion generates the code image as a substantially invisible image.

According to another aspect of the present invention, the code image generating portion generates a particular portion of the code image included in the second area as a visible image, and wherein the code image generating portion generates a remaining portion of the code image included in the second area and the code image included in the first area as a substantially invisible image.

According to another aspect of the present invention, a printing medium comprises: a code image that indicates a position on a medium; wherein a particular portion of the code image has a visible attribute, and a remaining portion of the code image has a substantially invisible attribute.

According to another aspect of the present invention, the particular portion is a portion that forms a character, a symbol, or a figure.

According to another aspect of the present invention, an image processing method comprises: acquiring mode information regarding a type of a printed matter; and executing at least one of a process of generating a print image that includes both a document image which is instructed to be printed and a code image indicating a position on a medium, and process of generating a print image that includes the code image indicating the position of the medium without receiving a printing instruction of the document image, in response to the mode information.

According to another aspect of the present invention, the code image is a substantially invisible image.

According to another aspect of the present invention, a particular portion of the code image is a visible image and a remaining portion of the code image is a substantially invisible image.

According to another aspect of the present invention, a storage medium is readable by a computer and storing a program of instructions executable by the computer to perform a function for generating a print image, the function comprises: acquiring mode information regarding a type of a printed matter; and executing at least one of a process of generating a print image that includes a document image which is instructed to be printed and a code image indicating a position on a medium, and a process of generating a print image that includes the code image indicating the position of the medium without receiving a printing instruction of the document image, in response to the mode information.

According to another aspect of the present invention, the code image is a substantially invisible image.

According to another aspect of the present invention, a particular portion of the code image is generated as a visible image, and a remaining portion of the code image is a substantially invisible image.

According to the above-embodiments, it may be feasible to obtain readily the memo paper that makes electronization of the handwritten memo possible.

The entire disclosure of Japanese Patent Application No. 2005-234721 filed on Aug. 12, 2005 including specification, claims, drawings and abstract is incorporated herein by reference in its entirety.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined solely by the following claims and their equivalents.

FIG. 1:
(1) 10 (image forming apparatus)
(2) 20 (processing apparatus)
(3) 30 (inputting/outputting device)
(4) 40 (apparatus main body)
(5) 50 (communication device)
(6) 60 (slot)

FIG. 3:
(1) instruction accepting portion 20*a*
(2) image outputting portion 20*b*
(3) corresponding information managing portion 21
(4) corresponding information DB 22
(5) information separating portion 23
(6) document image generating portion 24
(7) document image buffer 25

(8) code image generating portion 26
(9) position information coding portion 26*a*
(10) position code generating portion 26*b*
(11) identification information coding portion 26*c*
(12) identification code generating portion 26*d*
(13) code arranging portion 26*g*
(14) pattern storing portion 26*h*
(15) pattern image generating portion 26
(16) code image buffer 27
(17) image synthesizing portion 28
(18) printing instruction
(19) identification information
(20) printing attributes
(21) document image
(22) code image
(23) output image FIG. 4:
(1) receive mode information (S201)
(2) Blank-sheet-of-paper mode ? (S202)
(3) acquire original data and printing attributes (S203)
(4) take out a medium ID (S204)
(5) save original data, and acquire an original ID (S205)
(6) register a correspondence between the medium ID and the original ID (S206)
(7) output the medium ID, the original data, and the printing attributes (S207)
(8) Does the original still remain ? (S208)
(9) receive printing attributes (S209)
(10) take out the medium ID (S210)
(11) register the medium ID (S211)
(12) output the medium ID and the printing attributes (S212)

FIG. 6:
(1) position code
(2) synchronizing code
(3) identification code
(4) pattern 0
(5) pattern 1

FIG. 8:
(1) point a line to which a border is added (S221)
(2) Is the dot ON ? (S222)
(3) store that this dot is printed by the visible toner (S223)
(4) Is the next dot present ? (S224)

FIG. 11:
(1) receive the original data and the printing attributes (S231)
(2) take out the medium ID (S232)
(3) save the original data, and acquire the original ID (S233)
(4) register correspondences between the medium ID, the original ID, and the printing attributes (S234)
(5) output the medium ID, the original ID, and the printing attributes (S235)

FIG. 12:
(1) medium ID
(2) original ID
(3) size
(4) longitudinal/lateral
(5) lateral
(6) longitudinal FIG. 13:
(1) Choose the function
(2) copy
(3) scan
(4) memo paper
(5) Choose the type of the memo paper
(6) border
(7) 6 mm spacing
(8) 12 mm spacing
(9) 18 mm spacing
(10) none
(11) paper
(12) A4 longitudinal
(13) reference original

What is claimed is:

1. An image forming apparatus, comprising:
a document image generating portion that generates a document image which is instructed to be printed;
a code image generating portion that generates a code image by generating a plurality of pattern images to indicate plural kinds of codes, and one kind of the plural codes being a positional code for indicating a position on a medium;
an accepting portion that accepts information indicating one of a first mode and a second mode,
wherein the code image generating portion generates the plurality of pattern images by generating first pattern images and second pattern images,
wherein the first pattern images and the second pattern images are not superimposed,
each first pattern image is formed of a visible image part and a substantially invisible part,
each second pattern image is formed of a substantially invisible part without having a visible image part, and
the visible image parts of the first pattern images forms a character, a symbol, or a figure which are unrelated to the plural kinds of codes.

2. The image forming apparatus according to claim 1, wherein the accepting portion accepts information indicating at least one of the first mode and the second mode from a user interface provided to the apparatus.

3. The image forming apparatus according to claim 1, wherein the accepting portion accepts information indicating at least one of the first mode and the second mode from other apparatus via a communication line.

4. An image processing apparatus, comprising:
a document image generating portion that generates a document image which is instructed to be printed;
a code image generating portion that generates a code image by generating a plurality of pattern images to indicate plural kinds of codes, and one kind of the plural codes being a positional code for indicating a position on a medium; and
an image synthesizing portion that generates a print image that has a first area which corresponds to first pattern images and a second area which corresponds to second pattern images,
wherein the first area and the second area are not superimposed,
wherein the code image generating portion generates the plurality of pattern images by generating the first pattern images and the second pattern images,
each first pattern image is formed of a visible image part and a substantially invisible part,
each second pattern image is formed of a substantially invisible part without having a visible image part, and
the visible image parts of the first pattern images forms a character, a symbol, or a figure which are unrelated to the plural kinds of codes.

5. The image processing apparatus according to claim 4, wherein the code image generating portion generates a particular portion of the code image included in the second area as a visible image, and
wherein the code image generating portion generates a remaining portion of the code image included in the second area and the code image included in the first area as the invisible image.

6. An image processing method, comprising a non-transitory computer readable medium including a program and a computer executable program code, the method comprising the steps of:

acquiring mode information regarding a type of a printed matter; and executing in response to the mode information, process of generating a print image that includes both a document image which is instructed to be printed and a code image, wherein the code image of the process is formed of a plurality of pattern images to indicate plural kinds of codes, one kind of the plural codes being a positional code for indicating a position on a medium, the plurality of pattern images are formed of first pattern images and second pattern images, wherein the first pattern images and the second pattern images are not superimposed, each first pattern image is formed of a visible image part and a substantially invisible part, each second pattern image is formed of a substantially invisible part without having a visible image part, the visible image parts of the first pattern images forms a character, a symbol, or a figure which are unrelated to the plural kinds of codes.

* * * * *